2,816,937
PREPARATION OF PHENYL MAGNESIUM CHLORIDE

Hugh E. Ramsden, Scotch Plains, N. J., assignor to Metal & Thermit Corporation, Rahway, N. J., a corporation of New Jersey No Drawing. Application February 18, 1957, Serial No. 640,599

38 Claims. (Cl. 260—665)

The present invention relates to a process of preparing phenyl magnesium chloride.

Although phenyl magnesium bromide has heretofore been known and used as a Grignard agent, its high cost has rendered its use non-attractive. Consequently, it was believed that phenyl magnesium chloride could be prepared more economically, thereby yielding a more desirable reagent. However, because of the extreme inertness of the aromatic chloride, the usual methods of preparing reagents in ether using chlorobenzene as a reactant were not successful for the preparation of phenyl magnesium chloride. In the past, resort was made to extreme conditions of high temperature and pressure for a long period, but even under these conditions, disappointing yields were obtained. Such processes were objectionable, not only because of the poor yields of the desired reagent, but also because of the formation of tars as by-products which were difficult to remove.

It is an object of this invention to provide an economical process for the preparation of phenylmagnesium chloride involving the reaction of chlorobenzene and magnesium.

It has been found the phenylmagnesium chloride may be prepared very readily by the reaction of chlorobenzene and magnesium through the use of an inorganic or organic catalyst containing an —NO₃ or —NO₂ group. More particularly the phenylmagnesium chloride may be prepared by reacting chlorobenzene with magnesium at reflux temperatures in the presence of catalytic amounts of inorganic or organic nitrates or organonitro compounds. The reflux temperatures may be of about 130–135° C. and preferably of about 130–132° C. It has further been found that 0.5–5% of said catalyst, and preferably 1%–2%, based on the weight of magnesium employed is sufficient to effect catalysis of the reaction of magnesium with chlorobenzene.

The catalysts that are useful in the present invention may be more particularly defined by the formula:

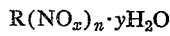

wherein $x$ has a value of 2 or 3, $n$ is the valence of group R, $y$ is zero or a positive number and R is selected from the class consisting of H, metal element, metalloid element or an organic radical preferably aliphatic or carbocyclic organic radicals. The catalysts employed in this invention include nitric acid, metal and metalloid nitrates, organic nitrates and organonitro compounds containing one or more nitro or nitrate groups in their hydrated or non-hydrated form.

More particularly the catalysts that are useful in the present invention may be described by the general formula:

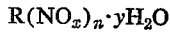

wherein R is selected from the class consisting of hydrogen, metal element, metalloid element, aliphatic radical, cycloaliphatic radical, aryl radical and aralkyl radical; $n$ is the valence of R; $x$ is 2 or 3, and $y$ is zero or a positive number. In preferred forms of this invention the aliphatic and cycloaliphatic radicals included within the definition of R are saturated aliphatic or saturated cycloaliphatic radicals; and the aryl or aralkyl radicals contain up to 3 carbocyclic rings in the aryl or aralkyl nucleus.

Any inorganic nitrate compound, including the hydrated forms of these nitrates, are useful as catalysts in the process of this invention. By way of illustration nitric acid and the metal and metalloid nitrates may be mentioned. Thus, for example, nitrates of the elements of group 1 of the periodic table Li, Na, K, Cu, Rb, Cs and Au are useful as catalysts in the present process as such or in their hydrated form. Likewise, nitrates of elements of group II of the periodic table Be, Mg, Cu, Zn, Sr, Cd, Ba, Hg and Ra are useful as catalysts in the process of the present invention. Similarly the nitrates, in the hydrated and non-hydrated form of the elements of group III of the periodic table are also useful as catalysts in the present invention. By way of illustration the nitrates of Al, Sc, Ga, Yt, In, Tl, and Ac may be mentioned. Analogously nitrates of the elements of group IV to VIII of the periodic table may also be used as catalysts in the process of this invention. These include the nitrates of Ti, Ge, Zr, Sn, Hf, Pb and Th (group IV); V, As, Cb, Sb, Ta, Bi, Pa (group V); Cr, Mo, W, V (group VI); Mn, Ma, Re (group VII); and Fe, Co, Ni, Ru, Ph, Pd, Os, Ir and Pt. These nitrates may be used in their hydrated or not hydrated form.

The inorganic nitrates that are of particular utility as catalysts in the present invention are HNO₃, and the nitrates on the metal elements of groups I and II of the periodic table. These may be expressed by the general formula:

$$Me(NO_3)_n \cdot yH_2O$$

wherein Me is hydrogen or a metal selected from groups I and II of the periodic table, $n$ is the valence of Me and $y$ is zero or a positive number depending on the degree of hydration of the nitrate. The degree of hydration may vary considerably. By way of illustration the number of molecules of water, bound as water of crystallization in the inorganic nitrate will vary from 0 to about 24 and preferably from 0 to about 6.

The organonitrogen compounds that are useful as catalysts in the process of the present invention are the organonitrates and the organonitro compounds. The former may be illustrated by the formula $R(ONO_2)_n$ and the latter by the formula $R(NO_2)_n$ wherein R may be aliphatic, preferably saturated aliphatic, cycloaliphatic, preferably saturated cycloaliphatic, aryl and aralkyl radicals, which preferably contain up to 3 rings in the aryl or aralkyl ring structure. These compounds include the mononitro or nitrate compounds as well as the poly nitro or nitrate compounds. Thus $n$ in said formula may be a small positive integer of the order of 1 to 6 and preferably of the order of 1 to 4.

A wide variety of organonitrates and organonitro compounds are useful as catalysts in the present invention. In the tables given below are illustrative organo nitro compounds and nitrates that are useful for the present purposes.

ALIPHATIC AND AROMATIC NITRO COMPOUNDS

| | |
|---|---|
| Nitromethane | Nitromesitylene |
| Nitroethane | p-Nitro-s-butylbenzene |
| 1-nitrobutane | p-Nitro-t-butylbenzene |
| 1-nitropentane | 2-nitro-4-isopropyltoluene |
| Nitrobenzene | 4-nitro-1,2-diethylbenzene |
| Phenylnitromethane | 1-nitronaphthalene |
| m-Nitrotoluene | 2-nitronaphthalene |
| 1-nitro-2-phenylethane | 2-nitrobiphenyl |
| o-Nitroethylbenzene | 4-nitrobiphenyl |
| p-Nitroethylbenzene | 3-nitrobiphenyl |
| 3-nitro-1,2-dimethylbenzene | 2-nitroacenaphthene |
| 4-nitro-1,2-dimethylbenzene | 2-nitrofluorene |
| 2-nitro-1,4-dimethylbenzene | 9-nitroanthracene |
| p-Nitrocumene (p-nitroisopropylbenzene) | |

HETEROCYCLIC NITRO COMPOUNDS

| | |
|---|---|
| 2-nitrothiophene | 7-nitroquinoline |
| 2-nitropyridine | 8-nitroquinoline |
| 3-nitrothionaphthene | 7-methyl-8-nitroquinoline |
| 5-nitrothionaphthene | 3-nitrodibenzofuran |
| 3-nitro-2,4,6-trimethylpyridine | 2-nitrodibenzothiophene |
| 3-nitroquinoline | 3-nitrocarbazole |
| 5-nitroquinoline | 2-nitroacridine |
| 6-nitroquinoline | |

POLYNITRO COMPOUNDS

| | |
|---|---|
| Tetranitromethane | 2,4-dinitro-2,3-dimethylpentane |
| 1,3-dinitropropane (purified) | Dinitrodurene |
| 2,4-dinitro-3-methylpentane | Dinitroprehnitene |
| 2,3-dimethyl-2,3-dinitrobutane | 1,3-dinitronaphthalene |
| o-Dinitrobenzene | 1,4-dinitronaphthalene |
| m-Dinitrobenzene | 2,2'-dinitrobiphenyl |
| p-Dinitrobenzene | 4,4'-dinitrodiphenylethane |
| 1,3,5-trinitrobenzene | |

NITRO OLEFINS

| | |
|---|---|
| Nitroethylene | 3-nitro-5-methyl-3-hexene |
| 1-nitro-1-propene | 1-cyclohexenenylnitromethane |
| 2-nitro-1-propene | 1-(2-thienyl)-2-nitropropene |
| 2-nitro-1-butene | 2-nitro-4-ethyl-2-hexene |
| 2-nitro-2-butene | β-Nitrostyrene |
| 2-nitro-1-pentene | m-Nitrostyrene |
| 2-nitro-1-hexene | p-Nitrostyrene |
| 2-nitro-2-hexene | 2,4,6-trinitrostyrene |
| 3-nitro-3-hexene | ω-,3-dinitrostyrene |
| 2-nitro-4-methyl-2-pentene | 3-nitro-5-ethyl-3-heptene |
| ω-Nitro-2-vinylthiophene | m-Nitrostilbene |
| 1-nitro-1-heptene | Cis-p-nitrostilbene |
| 2-nitro-1-heptene | p-Nitrostilbene |

NITRO HALIDES

| | |
|---|---|
| 1-chloro-1-bromo-2-nitroethane | p-Chloronitrobenzene |
| 1-chloro-2-nitropropane | p-Bromonitrobenzene |
| 2-bromo-2-nitropropane | 1,2,3-triiodo-5-nitrobenzene |
| 1-chloro-4-nitrobutane | o-Nitrobenzyl bromide |
| o-Chloronitrobenzene | m-Nitrobenzyl chloride |
| o-Bromonitrobenzene | m-Nitrobenzyl bromide |
| m-Fluoronitrobenzene | p-Nitrobenzyl iodide |
| m-Chloronitrobenzene | o-Nitrophenylethyl bromide |
| m-Bromonitrobenzene | p-Nitrophenylethyl bromide |
| p-Fluoronitrobenzene | |

NITRO ALCOHOLS AND NITRO PHENOLS

| | |
|---|---|
| 2,2,2-trinitroethanol | 2,4-dinitriphenol |
| 2-nitro-1-propanol | 4-nitro-3,5-heptanediol |
| 3-nitro-2-butanol | 1-nitromethyl-1-cyclohexanol |
| Nitro-t-butyl alcohol | o-Nitrobenzyl alcohol |
| 1-nitro-2-pentanol | m-Nitrobenzyl alcohol |
| 1-nitro-3-methyl-2-butanol | 2-nitro-4-methylphenol |
| 2-ethyl-2-nitro-1,3-propanediol | 1-nitro-2-octanol |
| 2-nitro-3-hexanol | 5-nitro-4-octanol |
| 3-nitro-4-hexanol | 1-phenyl-2-nitroethanol |
| 1-nitro-4-methyl-2-pentanol | m-Nitrophenylmethylcarbinol |
| o-Nitrophenol | β-(4-nitrophenyl)-ethanol |
| p-Nitrophenol | 2-nitro-1-phenyl-1-propanol |
| m-Nitrophenol | |
| 2-nitrohydroquinone | |

NITRO ETHERS

| | |
|---|---|
| Methyl 2-nitroethyl ether | o-Nitroethyoxybenzene |
| o-Nitroanisole | o-Nitrodiphenyl ether |
| p-Nitroanisole | p-Nitrodiphenyl ether |
| 2-nitro-5-methoxytoluene | |

NITRO ALDEHYDES AND KETONES

| | |
|---|---|
| 5-nitro-4,4-dimethyl-2-pentanone | o-Nitroacetophenone |
| o-Nitrobenzaldehyde | m-Nitroacetophenone |
| m-Nitrobenzaldehyde | p-Nitroacetophenone |
| p-Nitrobenzaldehyde | m-Nitropropiophenone |
| 2,4-dinitrobenzaldehyde | o-Nitrophenyl 2-thienyl ketone |
| Nitroterephthaldehyde | 2,4,7-trinitrofluorenone |
| α-Nitroacetophenone | o,o'-Dinitrobenzil |

NITRO ACIDS

| | |
|---|---|
| 4-nitropentanoic acid | 2,4,6-trinitrobenzoic acid |
| o-Nitrobenzoic acid | o-Nitrophenylacetic acid |
| m-Nitrobenzoic acid | m-Nitrophenylacetic acid |
| p-Nitrobenzoic acid | p-Nitrophenylacetic acid |
| 2,4-dinitrobenzoic acid | 3-nitrophthalic acid |
| 3,5-dinitrobenzoic acid | 4-nitrophthalic acid |

NITRO ESTERS

| | |
|---|---|
| Methyl nitroacetate | Methyl p-nitrobenzoate |
| Ethyl nitroacetate | Methyl 2,4-dinitrobenzoate |
| Methyl γ-nitrobutyrate | o-Nitrophenyl acetate |
| 2-nitrobutyl formate | p-Nitrophenyl acetate |
| 2-nitroisobutyl formate | |
| 2-nitroethyl propionate | Methyl p-nitrophenylacetate |
| Dimethyl nitromalonate | Ethyl p-nitrobenzoate |
| Ethyl 3-methyl-4-nitrobutanoate | p-Nitrobenzyl acetate |
| | Ethyl o-nitrophenylacetate |
| Diethyl nitromalonate | Ethyl p-nitrophenylacetate |
| Methyl m-nitrobenzoate | |

NITRO CYANIDES

| | |
|---|---|
| 2-nitro-n-propyl cyanide | o-Nitrobenzonitrile |
| 2-nitroisopropyl cyanide | m-Nitrobenzonitrile |
| 4-nitro-n-butyl cyanide | p-Nitrobenzonitrile |
| 2-nitro-1-methyl-n-propyl cyanide | 2,4-dinitrobenzonitrile |
| | 3,5-dinitrobenzonitrile |
| Nitro-t-butyl cyanide | o-Nitrobenzyl cyanide |
| 3-nitro-3-methyl-n-butyl cyanide | m-Nitrobenzyl cyanide |
| | p-Nitrobenzyl cyanide |
| 3-nitro-1,2-dimethyl-n-butyl cyanide | |

NITRO AMINES

| | |
|---|---|
| 2-amino-1-nitropropane | p-Nitrobenzylamine |
| 2-nitro-3-aminobutane | 3-nitro-p-toluidine |
| 1-nitro-2-amino-2-methylpropane | 2-nitro-p-toluidine |
| | o-Nitromethylaniline |
| N-(2-nitroisobutyl)-methylamine | 1-diethylamino-2-nitrobutane |
| N-(2-nitrobutyl)-dimethylamine | 2-nitro-3-diethylaminobutane |
| | 1-diethylamino-2-methyl-2-nitropropane |
| N-(2-nitroisobutyl)-dimethylamine | N,N-dimethyl-o-nitroaniline |
| o-Nitroaniline | N,N-dimethyl-m-nitroaniline |
| m-Nitroaniline | N,N-dimethyl-p-nitroaniline |
| 2,4-dinitroaniline | N-(2-nitroisobutyl)-aniline |
| 2,6-dinitroaniline | N,N-diethyl-p-nitroaniline |
| N-(2-nitropropyl)-diethylamine | N,N-diethyl-3-nitrobenzylamine |
| N-(2-nitro-2-methylbutyl)-dimethylamine | N,N-diethyl-4-nitrobenzylamine |
| o-Nitrobenzylamine | α-Nitro-β-anilino-β-phenylethane |
| m-Nitrobenzylamine | |

CYCLOALIPHATIC NITRO COMPOUNDS

| | |
|---|---|
| Nitrocyclohexane | Nitrocyclobutane |
| Nitrocyclopentane | Nitrocyclopropane |

ALIPHATIC AND AROMATIC NITRATES

| | |
|---|---|
| Methyl nitrate | Benzyl nitrate |
| Isopropyl nitrate | Glycerol nitrate |
| Butyl nitrate | Ethylene glycol nitrate |
| Phenyl nitrate | |

As noted above many compounds containing an —NO$_2$ group or an NO$_3$ are useful as catalysts in the process of the present invention. Among these the most preferred catalysts are as follows: Sr(NO$_3$)$_2$, Cu(NO$_3$)$_2$.3H$_2$O, NaNO$_3$, Zn(NO$_3$)$_2$.6H$_2$O, KNO$_3$, HNO$_3$, Ca(NO$_3$)$_2$, Ba(NO$_3$)$_2$, Cd(NO$_3$)$_2$, Mg(NO$_3$)$_2$, nitrobenzene, nitromethane, nitropropane, trinitrotoluene, trinitrophenol, tetranitroaniline.

The raw materials utilized in the present invention were standard commercial products. The magnesium utilized in the present invention did not necessarily possess a clean, unoxidized surface, but could be old and dirty. The magnesium may be in the form of turnings (resulting from milling the magnesium), granular material (produced on a hammer-mill), or in other comminuted forms. Similarly, the chlorobenzene was not a pure product but contained the usual impurities found in the commercial products. Since chlorobenzene is usually prepared from industrial coal tar benzene, it is expected that small amounts of chlorothiophene may be present in the commercial product. On analysis, the chlorobenzene used was found to contain 0.18% sulfur. Likewise, the catalysts used in the present invention were ordinary untreated commercial products containing the usual impurities.

A feature of the present invention is the utilization of reflux temperatures of about 130–135° C. and preferably 130–132° C. at atmospheric pressure. This temperature range overcomes the disadvantages arising from the prior methods wherein superatmospheric pressures and temperatures above about 150° C. were employed. The violent reaction which could ensue as a result of such severe conditions results in charring and in the formation of tars. With the present invention, the reaction between chlorobenzene and magnesium is easily controlled. The non-exothermicity of this reaction renders it necessary to apply heat in order to obtain a reaction. It is possible by merely withdrawing the heat source to halt the reaction for a determined period of time after which further application of heat will permit the reaction to continue. As about ten to twenty hours is necessary in order to obtain complete reaction between the magnesium and chlorobenzene, the removal of the source of heat permits halting of the reaction when desired and its resumption at a future time.

Another embodiment of the present process resides in the advantageous use of a diluent or solvent during the reaction. It has been found that in the absence of a diluent, the reaction mixture becomes so viscous as to inhibit further reaction, thereby reducing the yield. It has also been found that charring occurs when no diluent is present during the reaction, thereby yielding an impure product. This solvent may be present at the beginning of the reaction or may be added to the reaction mixture at any time after initiation of the reaction but before it has become unduly viscous. In view of the variety of catalysts and diluents useful herein, the last possible time for addition of the diluent must be determined separately for each material by simply observing the consistency of the mixture as the reaction progresses. Suitable solvents or diluents include chlorobenzene, benzene, toluene, xylene, phenyl ether, mixtures thereof and the like. If more than one mole of chlorobenzene per mole of magnesium is present in the reaction mixture, the excess chlorobenzene acts as a diluent and no other solvent need be added.

Another preferred embodiment of the present invention resides in carrying out the reaction under an inert atmosphere. Although this is not essential in the present process, the exclusion of air and its displacement by, for instance, nitrogen results in a shorter initiation period. Other suitable inert gases include argon, krypton, neon and helium. By initiation period is meant the time from the beginning of reflux to the time the reaction actually commences. This period can generally vary over a range of about ten minutes to about one hour. However, when carrying out this reaction under nitrogen, an initiation period of only about twenty minutes to thirty-five minutes is observed as a result. Another deleterious effect of the oxygen in the air on the reagent is the formation of phenols as a result of air oxidation. Thus, while a nitrogen atmosphere is not essential in the present process, it does provide additional advantages in the obtention of phenyl magnesium chloride in high yield and purity.

Still another embodiment of the invention resides in efficient agitation of the reaction mixture. It has been found that stirring is essential to the obtention of a high yield of a pure product. The absence of agitation may result in charring, a considerably longer initiation period and consequently a less economical process. The degree of agitation, namely, the speed of the stirrers, affects the rapidity of the reaction. More specifically, rapid agitation on the order of 10,000 R. P. M. allows the reaction to be complete three hours after reflux (130° C.), whereas slow stirring, on the order of 100–200 R. P. M., may require 20 hours after reflux starts for completion. Furthermore, rapid agitation causes the reaction to commence before reflux temperatures of about 130° C. are reached, reaction being noted at 110° C.–118° C. Rapid agitation reduces the reaction period and is advantageous where rapidity of reaction is a desirable feature, but it is not essential in the present invention.

The phenyl magnesium chloride yields obtained by this process range from 75%–95% based on the weight of magnesium as compared to prior processes wherein a maximum of only 50% by weight of the magnesium has been obtained. This process affords a considerable saving, rendering the present process a commercially superior procedure for the manufacture of the phenyl magnesium chloride reagent. In addition, the catalytic initiation of the reaction between magnesium and chlorobenzene is brought about uniformly in ten to sixty-five minutes instead of the usual lengthy period.

The following examples are further illustrative of the present invention, and it will be understood that the invention is not limited thereto:

*Example I*

24.3 gms. (1 g. atom) of magnesium turnings, 562.5 gms. (5 moles) of commercial chlorobenzene, and 0.25 gm. (1% by weight of the magnesium) of potassium nitrate (KNO$_3$) were charged into a one liter, 3-necked flask equipped with a stainless steel anchor stirrer, reflux condenser, a thermometer, and a Glas-col heater. All joints were glass. This mixture was stirred and heated to reflux. Thirty minutes after reflux began, a greenish color developed in the mix indicating that the reaction had started. Heating was continued for 20 hours longer. The mixture was cooled, diluted with anhydrous ethyl ether and made up to one liter of solution in a volumetric flask by addition of more ether. The solution was shaken to disperse solids, allowed to settle for a moment, and a 20 ml. sample was pipetted into a 500 ml. Erlenmeyer flask containing 50 ml. water and 50 ml. of 0.5 H$_2$SO$_4$. The whole mixture was heated on a steam bath for thirty minutes. 1.5 ml. of 0.04% bromocresol purple was used as an indicator for the back-titration with 0.2 N NaOH solution and the yield was calculated. This is the well known Gilman titration, somewhat modified. The yield for this run (based on the average of 3 titrations) was 95.4%. If desired the phenyl magnesium chloride may be separated from excess chlorobenzene by distillation after reaction is completed.

The following table represents additional Examples 2–8 inclusive, of the present invention, wherein the apparatus, procedure and ingredients of Example I were utilized except as specified in the table. The specific catalysts and percentage of yield for each example varied as indicated therein, the percentage of yield being based on the magnesium content. The conditions of reaction for each experiment were varied by subjecting the reaction mixture to differing reaction times as shown in the ensuing table. By initiation time is meant the time from the beginning of reflux, which is at about 130° C., until the reaction starts as evidenced by the development of a green color. By reaction time is meant the total time for refluxing of the reaction mixture after the reaction has started (i. e., time of reaction after initiation thereof). Other conditions that were varied during the reaction between the magnesium and chlorobenzene appear under the heading "Remarks." The yield of the final reaction product, phenyl magnesium chloride, was calculated as in Example I, based on the magnesium content. In each example, commercial magnesium turnings, commercial chlorobenzene and commercial catalysts were used unless specified to the contrary.

*Example 12*

The procedure of Example 9 is followed excepting that 1% by weight of $Mg(NO_3)_2 \cdot 2H_2O$ (based on the magnesium employed) is used in place of the calcium nitrate employed in Example 9.

*Example 13*

The procedure of Example 9 is followed excepting that 1.2% by weight of $Hg(NO_3)_2.H_2O$ (based on magnesium employed) is used in place of the calcium nitrate employed in Example 9.

*Example 14*

The procedure of Example 9 is followed excepting that 2% by weight of $AgNO_3$ (based on magnesium employed) is used instead of the calcium nitrate.

| Example | Percent catalyst | Initiation time | | Reaction time | | Remarks | Percent yield |
|---|---|---|---|---|---|---|---|
| | | Hrs. | Min. | Hrs. | Min. | | |
| 1 | 1% $KNO_3$ | | 30 | 20 | | | 95.4 |
| 2 | 1% $KNO_3$ | | 20 | 10 | | $N_2$ atmosphere [1] | 90.8 |
| 3 | 1% $Sr(NO_3)_2$ | | 20 | 20 | | Same | 90.5 |
| 4 | 1% $Cu(NO_3)_2.3H_2O$ | | 40 | 19 | 50 | Same | 92.0 |
| 5 | 1% $NaNO_3$ | | 22 | 20 | | Same | 95.2 |
| 6 | 1% $Zn(NO_3)_2.6H_2O$ | 1 | 07 | 20 | | Same | 96.6 |
| 7 | 1% nitrobenzene | | 10 | 20 | | Same | 91.6 |
| 8 | 1% $HNO_3$ | | 20 | 19 | 45 | Same | 92.1 |

[1] The reflux condenser was connected to a static nitrogen set up.

This table discloses the advantages of the present process. The yield of phenyl magnesium chloride, based on the magnesium content is within the range of about 90–97%, as compared to a maximum of 50% in the prior processes. Another advantage is the shorter initiation time of this process which is usually a matter of 10 minutes to about one hour. Still another advantage is apparent from the considerably shorter reaction time utilizable herein which is a period of 10–20 hours in lieu of a period of days. Thus it is apparent that the aforementioned unusual advantages have resulted in a considerable saving in time, the elimination of expensive apparatus and the preliminary treatment of reactants, increased yield of reagent, all of said factors combining to reduce the cost or difficulty of manufacturing phenyl magnesium chloride.

The following examples are further illustrative of the present invention.

*Example 9*

24.3 gms. (1 g. atom of magnesium turnings) 562.5 gms. (5 moles of) of commercial chlorobenzene, and 0.25 gm. (1% by weight of the magnesium) of $Ca(NO_3)_2$ are charged into a one liter, 3-necked flask equipped with a stainless steel anchor stirrer, reflux condenser, a thermometer, and a Glas-col heater. This mixture was stirred and heated to reflux until a greenish color developed in the mix. The heating was then continued for 20 hours longer to complete the reaction and preparation of the phenyl magnesium chloride.

*Example 10*

The procedure of Example 9 is followed excepting that 2% by weight by $Ba(NO_3)_2$ (based on the magnesium employed) is used instead of the calcium nitrate employed in Example 9.

*Example 11*

The procedure of Example 9 is followed except that 1.5% by weight of $Cd(NO_3)_2$ (based on the magnesium employed) is used instead of the calcium nitrate employed in Example 9.

*Example 15*

The procedure of Example 9 is followed excepting that 1% by weight of nitromethane (based on the weight of magnesium) is employed in place of the calcium nitrate of Example 9.

*Example 16*

The procedure of Example 9 is followed excepting that 1.5% by weight of nitropropane (based on weight of magnesium employed) is employed in place of the calcium nitrate of Example 9.

*Example 17*

The procedure of Example 9 is followed excepting that 2% by weight of trinitrotoluene (based on weight of magnesium) is employed in place of the calcium nitrate of Example 9.

*Example 18*

The procedure of Example 9 is followed excepting that 1.2% by weight of trinitrophenol (based on weight of magnesium employed) is used instead of the calcium nitrate of Example 9.

*Example 19*

The procedure of Example 9 is followed excepting that 1% by weight of tetranitroaniline (based on weight of magnesium employed) is used instead of the calcium nitrate of Example 9.

In the following examples 1 g. atom of magnesium turnings and 5 moles of commercial chlorobenzene and the amount of catalysts indicated are charged into a 3-necked flask equipped with a stainless steel anchor, reflux condenser, thermometer and Glas-col heater. The mixture is stirred and heated to reflux until a greenish color develops in the mix. The heating is then continued for 20 hours longer to complete the preparation of phenylmagnesium chloride. The percentage of catalyst employed in the following examples is the percentage by weight of catalyst based on the weight of magnesium employed in the reaction.

| Example No. | Catalyst | Percent Catalyst |
|---|---|---|
| 20 | Al(NO₃)₃.9H₂O | 1 |
| 21 | Be(NO₃)₂.3H₂O | 1 |
| 22 | Bi(NO₃)₃.5H₂O | 1 |
| 23 | Cd(NO₃)₂.4H₂O | 1.2 |
| 24 | Ca(NO₃)₂.3H₂O | 2 |
| 25 | Ca(NO₃)₂.4H₂O | 1.5 |
| 26 | Ce(NO₃)₃.6H₂O | 1.5 |
| 27 | Ce(OH)(NO₃)₃.3H₂O | 1.2 |
| 28 | CsNO₃ | 1 |
| 29 | Cr(NO₃)₃.7½H₂O | 1 |
| 30 | Cr(NO₃)₃.9H₂O | 2 |
| 31 | Co(NO₃)₂.6H₂O | 2 |
| 32 | Cu(NO₃)₂.6H₂O | 1 |
| 33 | Dy(NO₃)₃.5H₂O | 1 |
| 34 | Cr(NO₃)₃.5H₂O | 1.5 |
| 35 | Gd(NO₃)₃.5H₂O | 2 |
| 36 | Gd(NO₃)₃.6H₂O | 1 |
| 37 | Ga(NO₃)₃ | 1.2 |
| 38 | AuH(NO₃)₄.3H₂O | 1 |
| 39 | In(NO₃).3H₂O | 1 |
| 40 | In(NO₃).4½H₂O | 2 |
| 41 | Fe(NO₃)₂.6H₂O | 2 |
| 42 | Fe(NO₃)₃.9H₂O | 1.5 |
| 43 | La(NO₃)₃.6H₂O | 1.2 |
| 44 | Pb(NO₃)₂ | 1.3 |
| 45 | LiNO₃ | 1 |
| 46 | LiNO₃.3H₂O | 1 |
| 47 | Mg(NO₃)₂.6H₂O | 1.5 |
| 48 | Mn(NO₃)₂.6H₂O | 1 |
| 49 | Hg(NO₃)₂.½H₂O | 2 |
| 50 | Nd(NO₃)₃.6H₂O | .5 |
| 51 | Ni(NO₃)₂.6H₂O | .5 |
| 52 | Pd(NO₃)₂ | 1 |
| 53 | KNO₃ | 4 |
| 54 | Rh(NO₃)₃ | 1.2 |
| 55 | Rh(NO₃)₃.2H₂O | 5 |
| 56 | RbNO₃ | 4 |
| 57 | Sm(NO₃)₃.6H₂O | 3 |
| 58 | Sc(NO₃)₃ | 1.2 |
| 59 | Sc(NO₃)₃.4H₂O | 1 |
| 60 | Sr(NO₃)₂.4H₂O | 1 |
| 61 | Tb(NO₃)₃.6H₂O | 2 |
| 62 | TlNO₃ | 2 |
| 63 | Tl(NO₃)₃ | 2 |
| 64 | Tl(NO₃)₃.3H₂O | 1 |
| 65 | Th(NO₃)₄ | 1 |
| 66 | Th(NO₃)₄.4H₂O | .5 |
| 67 | Th(NO₃)₄.12H₂O | 1 |
| 68 | Sn(NO₃)₂.20H₂O | 1.2 |
| 69 | Sn(NO₃)₄ | .5 |
| 70 | VO₂(NO₃)₂.6H₂O | 1 |
| 71 | Y(NO₃).4H₂O | 1 |
| 72 | Y(NO₃).6H₂O | 1 |
| 73 | Zn(NO₃)₂.3H₂O | 1 |
| 74 | Nitroethane | 1 |
| 75 | 1-nitrobutane | 1 |
| 76 | Nitropentane | 1 |
| 77 | Phenylnitromethane | 1.2 |
| 78 | 1-nitro-2-phenylethane | 1.5 |
| 79 | 3-nitro-1,2-dimethylbenzene | 2.0 |
| 80 | Nitromesitylene | .5 |
| 81 | 2-nitro-4-isopropyltoluene | 1.4 |
| 82 | 1-nitronaphthalene | 1 |
| 83 | 2-nitrobiphenyl | 1 |
| 84 | 2-nitroacenaphthene | 1.2 |
| 85 | 2-nitrofluorene | 1 |
| 86 | 9-nitroanthracene | 1 |
| 87 | 1,3-dinitropropane (purified) | 2 |
| 88 | 2,3-dimethyl-2,3-dinitrobutane | 1.5 |
| 89 | Dinitroprehnitene | 1 |
| 90 | 1,3-dinitronaphthalene | 1 |
| 91 | 1,4-dinitronaphthalene | 1.2 |
| 92 | 2,2'-dinitrobiphenyl | 1.2 |
| 93 | 4,4'-dinitrodiphenylethane | 1 |
| 94 | Nitroethylene | 2 |
| 95 | 2-nitro-1-propene | 2 |
| 96 | 2-nitro-1-pentene | 1 |
| 97 | 3-nitro-3-hexene | 1.4 |
| 98 | 2-nitro-1-heptene | 1 |
| 99 | β-Nitrostyrene | 1 |
| 100 | 2,4,6-trinitrostyrene | 1 |
| 101 | 3-nitro-5-ethyl-3-heptene | 1.2 |
| 102 | m-Nitrostilbene | 1.3 |
| 103 | 1-chloro-1-bromo-2-nitroethane | 1 |
| 104 | 2-bromo-2-nitropropane | 1 |
| 105 | o-Chloronitrobenzene | 4 |
| 106 | o-Bromonitrobenzene | 3 |
| 107 | m-Fluoronitrobenzene | 1 |
| 108 | m-Bromonitrobenzene | |
| 109 | 1,2,3-triiodo-5-nitrobenzene | 1.2 |
| 110 | o-Nitrobenzyl bromide | 1 |
| 111 | m-Nitrobenzyl chloride | 2 |
| 112 | p-Nitrobenzyl chloride | 1.5 |
| 113 | p-Nitrobenzyl iodide | 1 |
| 114 | o-Nitrophenylethyl bromide | 1 |
| 115 | p-Nitrophenylethyl bromide | 2 |
| 116 | 2,2,2-trinitroethanol | 1 |
| 117 | 2-nitro-1-propanol | 1 |
| 118 | 3-nitro-2-butanol | 1 |
| 119 | Nitro-t-butyl alcohol | 1 |
| 120 | 1-nitro-3-methyl-2-butanol | 2 |
| 121 | 2-nitro-3-hexanol | 1.2 |
| 122 | o-Nitrophenol | 1 |
| 123 | p-Nitrophenol | 1.4 |
| 124 | m-Nitrophenol | 1.4 |
| 125 | 2-nitrohydroquinone | 1 |
| 126 | 2,4-dinitrophenol | 1 |
| 127 | o-Nitrobenzyl alcohol | 2 |
| 128 | m-Nitrobenzyl alcohol | 2 |
| 129 | p-Nitrobenzyl alcohol | 1.5 |
| 130 | 2-nitro-4-methylphenol | 1 |
| 131 | 1-nitro-2-octanol | 1 |
| 132 | 1-phenyl-2-nitroethanol | 1 |
| 133 | β-(4-nitrophenyl)-ethanol | 1.2 |
| 134 | Methyl 2-nitroethyl ether | .5 |
| 135 | o-Nitroanisole | 1 |
| 136 | o-Nitroethoxybenzene | 1 |
| 137 | p-Nitrodiphenyl ether | 1.2 |
| 138 | o-Nitrobenzaldehyde | 1.5 |
| 139 | 2,4-dinitrobenzaldehyde | 1 |
| 140 | Nitroterephthaldehyde | 1 |
| 141 | o-Nitroacetophenone | 1.3 |
| 142 | n-Nitroacetophenone | 1.4 |
| 143 | 2,4,7-trinitrofluorenone | 1 |
| 144 | o,o-Dinitrobenzil | 1 |
| 145 | 4-nitropentanoic acid | 2 |
| 146 | o-Nitrobenzoic acid | 1.5 |
| 147 | p-Nitrobenzoic acid | 1 |
| 148 | 2,4,6-trinitrobenzoic acid | 1 |
| 149 | m-Nitrophenylacetic acid | 1.4 |
| 150 | 3-nitrophthalic acid | .5 |
| 151 | Methyl nitroacetate | 1 |
| 152 | Ethyl nitroacetate | 5 |
| 153 | 2-nitroethyl propionate | 4 |
| 154 | Diethyl nitromalonate | 1.2 |
| 155 | Methyl p-nitrobenzoate | 1.1 |
| 156 | o-Nitrophenyl acetate | 1 |
| 157 | p-Nitrophenyl acetate | 1 |
| 158 | do | 1.2 |
| 159 | Ethyl p-nitrophenylacetate | 1.5 |
| 160 | 2-nitro-n-propyl cyanide | 1 |
| 161 | 4-nitro-n-butyl cyanide | 1.4 |
| 162 | m-Nitrobenzonitrile | 1 |
| 163 | 2,4-dinitrobenzonitrile | 1 |
| 164 | o-Nitrobenzyl cyanide | .3 |
| 165 | 2-amino-1-nitropropane | 1 |
| 166 | 2-nitro-3-aminobutane | 1.2 |
| 167 | o-Nitroaniline | 1.2 |
| 168 | N-(2-nitropropyl)-diethylamine | 1.5 |
| 169 | N-(2-nitro-2-methylbutyl)-dimethylamine | 1 |
| 170 | o-Nitrobenzylamine | 2 |
| 171 | p-Nitrobenzylamine | 1.5 |
| 172 | 3-nitro-p-toluidine | 2 |
| 173 | o-Nitromethylaniline | 1 |
| 174 | 1-diethylamino-2-nitrobutane | 1 |
| 175 | N,N-dimethyl-o-nitroaniline | 1 |
| 176 | N-(2-nitroisobutyl)-aniline | 1 |
| 177 | N,N-diethyl-3-nitrobenzylamine | 1 |
| 178 | α-Nitro-β-anilino-β-phenylethane | 1.2 |

While the invention has been described with reference to various examples and embodiment it will be apparent to those skilled in the art that various modifications may be made, and equivalents substituted therefor, without departing from the principles and true nature of the present invention.

What is claimed is:

1. A method of preparing phenylmagnesium chloride which comprises reacting chlorobenzene with magnesium at reflux temperatures in the presence of catalytic amounts of catalyst containing the group (—NO$_x$) wherein $x$ has a value from 2 to 3 inclusive, to form phenylmagnesium chloride.

2. A method according to claim 1, wherein an inert diluent is employed as a reaction medium.

3. A method according to claim 1, wherein said catalyst is used in amounts of about 0.5% to 5% by weight based on the weight of magnesium employed.

4. A method according to claim 1, wherein said catalyst is used in amounts of about 1% to 2% by weight based on the weight of magnesium employed.

5. A method according to claim 4, wherein the reflux temperature is about 130° C. to 135° C.

6. A method of preparing phenylmagnesium chloride which comprises reacting chlorobenzene with magnesium at reflux temperatures in the presence of catalytic amounts of catalyst of general formula $$R(NO_x)_n \cdot yH_2O$$

wherein $x$ has a value from 2 to 3 inclusive, $n$ is the valence of R, $y$ is a small number including zero and R is selected from the class consisting of inorganic cations, aliphatic radical, cycloaliphatic radical, carbocyclic aromatic radical and heterocyclic radical.

7. A method according to claim 6, wherein an inert diluent is employed as a reaction medium.

8. A method according to claim 6, wherein said catalyst is used in amounts of about 0.5% to 5% by weight based on the weight of magnesium employed.

9. A method according to claim 6, wherein said catalyst is used in amounts of about 1% to 2% by weight based on the weight of magnesium employed.

10. A method according to claim 9, wherein the reflux temperature is about 130° C. to 135° C.

11. A method of preparing phenylmagnesium chloride which comprises reacting chlorobenzene with magnesium at reflux temperature in the presence of catalytic amounts of a catalyst of general formula $$R(NO_3)_n \cdot yH_2O$$

wherein R is an inorganic cation, $n$ is the valence of R and $y$ has a value from 0 to 24.

12. A method according to claim 11, wherein an inert diluent is employed as a reaction medium.

13. A method according to claim 11, wherein said catalyst is used in amounts of about 0.5% to 5% by weight based on the magnesium employed.

14. A method according to claim 11, wherein said catalyst is used in amounts of about 1% to 2% by weight based on the magnesium employed.

15. A method according to claim 14, wherein the reflux temperature is about 130° C. to 135° C.

16. A method according to claim 11, wherein said R is a metal cation.

17. A method according to claim 16, wherein said catalyst is employed in an amount of about 0.5% to 5% by weight based on the weight of magnesium employed.

18. A method according to claim 17, wherein said catalyst is employed in the amount of about 1% to 2% by weight based on the magnesium employed.

19. A method according to claim 18, wherein the reflux temperature is about 130° C. to 135° C.

20. A method according to claim 18, wherein the catalyst is sodium nitrate.

21. A method according to claim 18, wherein the catalyst is potassium nitrate.

22. A method according to claim 18, wherein the catalyst is magnesium nitrate.

23. A method according to claim 18, wherein the catalyst is cadmium nitrate.

24. A method according to claim 18, wherein the catalyst is zinc nitrate.

25. A method according to claim 1, wherein phenylmagnesium chloride is recovered.

26. A method according to claim 6, wherein phenylmagnesium chloride is recovered.

27. A method of preparing phenyl magnesium chloride which comprises reacting chlorobenzene with magnesium at reflux temperatures in the presence of catalytic amounts of a catalyst selected from the class consisting of strontium nitrate, copper nitrate, sodium nitrate, zinc nitrate, potassium nitrate, nitric acid and nitrobenzene to form said phenyl magnesium chloride.

28. A method of preparing phenyl magnesium chloride which comprises reacting chlorobenzene with magnesium at reflux temperatures in the presence of catalytic amounts of a catalyst selected from the class consisting of strontium nitrate, copper nitrate, sodium nitrate, zinc nitrate, potassium nitrate, nitric acid and nitrobenzene to form said phenyl magnesium chloride.

29. A method of preparing phenyl magnesium chloride which comprises mixing chlorobenzene, magnesium and catalytic amounts of a catalyst selected from the class consisting of strontium nitrate, copper nitrate, sodium nitrate, zinc nitrate, potassium nitrate, nitric acid and nitrobenzene, agitating and heating said mixture to reflux temperatures, maintaining said mixture at reflux temperatures by the application of heat until the reaction is complete, to form phenyl magnesium chloride.

30. A method of preparing phenyl magnesium chloride which comprises mixing equimolecular amounts of chlorobenzene and magnesium and 0.5–5% by weight, based on magnesium of a catalyst selected from the class consisting of strontium nitrate, copper nitrate, sodium nitrate, zinc nitrate, potassium nitrate, nitric acid and nitrobenzene, agitating and heating said mixture to reflux temperatures, adding a diluent after the reaction has started but prior to completion thereof, maintaining said mixture at reflux temperatures by the application of heat until the reaction is complete, to form phenyl magnesium chloride.

31. A method of preparing phenyl magnesium chloride which comprises mixing equimolecular amounts of chlorobenzene and magnesium, and 0.5–5% by weight, based on magnesium of a catalyst selected from the class consisting of strontium nitrate, copper nitrate, sodium nitrate, zinc nitrate, potassium nitrate, nitric acid and nitrobenzene, agitating and heating said mixtures to reflux temperatures, adding additional chlorobenzene after the reaction has started but prior to completion thereof, maintaining said mixture at reflux temperatures by the application of heat until the reaction is complete, to form phenyl magnesium chloride.

32. A method of preparing phenyl magnesium chloride which comprises mixing chlorobenzene, magnesium, a diluent and catalytic amounts of a catalyst selected from the class consisting of strontium nitrate, copper nitrate, sodium nitrate, zinc nitrate, potassium nitrate, nitric acid and nitrobenzene, agitating and heating said mixture to reflux temperatures, maintaining said mixture at reflux temperatures by the application of heat until the reaction is complete, to form phenyl magnesium chloride.

33. A method of preparing phenyl magnesium chloride which comprises reacting chlorobenzene with magnesium at reflux temperatures and in an inert atmosphere in the presence of catalytic amounts of a catalyst selected from the class consisting of strontium nitrate, copper nitrate, sodium nitrate, zinc nitrate, potassium nitrate, nitric acid and nitrobenzene, to form said phenyl magnesium chloride.

34. A method of preparing phenyl magnesium chloride which comprises mixing chlorobenzene, magnesium and catalytic amounts of a catalyst selected from the class consisting of strontium nitrate, copper nitrate, sodium nitrate, zinc nitrate, potassium nitrate, nitric acid and nitrobenzene, agitating and heating said mixture to reflux temperatures of about 130–132° C., maintaining said mixture at reflux temperatures of about 130–132° C. by the application of heat until the reaction is complete, to form phenyl magnesium chloride.

35. A method of preparing phenyl magnesium chloride which comprises mixing chlorobenzene, magnesium and catalytic amounts of a catalyst selected from the class consisting of strontium nitrate, copper nitrate, sodium nitrate, zinc nitrate, potassium nitrate, nitric acid and nitrobenzene, agitating and heating said mixture to reflux temperatures, maintaining said mixture at reflux temperatures by the application of heat until the reaction is complete, to form phenyl magnesium chloride.

36. A method according to claim 27, wherein the phenylmagnesium chloride is recovered.

37. A method according to claim 30, wherein the phenylmagnesium chloride is recovered.

38. A method according to claim 36, wherein the phenylmagnesium chloride is recovered.

References Cited in the file of this patent

UNITED STATES PATENTS

| Number | Name | Date |
|---|---|---|
| 1,996,746 | Britton et al. | Apr. 9, 1935 |
| 2,056,822 | Britton et al. | Oct. 6, 1936 |
| 2,058,373 | Weissenborn | Oct. 20, 1936 |
| 2,552,677 | Hill | May 15, 1951 |
| 2,623,077 | Croxall et al. | Dec. 23, 1952 |
| 2,795,628 | Ramsden | July 11, 1957 |